United States Patent
Boling et al.

(10) Patent No.: US 8,018,332 B2
(45) Date of Patent: Sep. 13, 2011

(54) GLOBAL EMERGENCY ALERT NOTIFICATION SYSTEM

(75) Inventors: Brian M. Boling, Knoxville, TN (US); Ronald D. Bishop, Trabucco Canyon, CA (US)

(73) Assignee: Procon, Inc., Knoxville, TN (US)

( * ) Notice: Subject to any disclaimer, the term of this patent is extended or adjusted under 35 U.S.C. 154(b) by 1254 days.

(21) Appl. No.: 11/669,239

(22) Filed: Jan. 31, 2007

(65) Prior Publication Data

US 2010/0271198 A1 Oct. 28, 2010

Related U.S. Application Data

(60) Provisional application No. 60/764,419, filed on Feb. 2, 2006.

(51) Int. Cl.
G08B 1/08 (2006.01)
H04M 11/04 (2006.01)
H04W 24/00 (2009.01)

(52) U.S. Cl. ........... 340/539.1; 340/539.11; 340/539.12; 455/404.1; 455/404.2; 455/425; 455/456.1; 455/456.3

(58) Field of Classification Search .................. None
See application file for complete search history.

(56) References Cited

U.S. PATENT DOCUMENTS

| | | | |
|---|---|---|---|
| 6,028,551 A | 2/2000 | Schoen et al. | |
| 6,690,268 B2 * | 2/2004 | Schofield et al. | 340/438 |
| 2003/0034881 A1 * | 2/2003 | Linnett et al. | 340/309.15 |
| 2004/0100368 A1 | 5/2004 | Lobaza et al. | |
| 2004/0100374 A1 | 5/2004 | Menard et al. | |
| 2005/0118983 A1 * | 6/2005 | Van Camp | 455/404.2 |
| 2005/0200479 A1 | 9/2005 | James | |
| 2006/0073838 A1 * | 4/2006 | Kamali et al. | 455/456.1 |
| 2006/0109960 A1 * | 5/2006 | D'Evelyn et al. | 379/37 |
| 2007/0078688 A1 * | 4/2007 | Bischof et al. | 705/3 |
| 2007/0139182 A1 * | 6/2007 | O'Connor et al. | 340/521 |
| 2007/0171037 A1 * | 7/2007 | Schofield et al. | 340/438 |
| 2008/0084305 A1 * | 4/2008 | Arnold | 340/572.1 |
| 2008/0252485 A1 * | 10/2008 | Lagassey | 340/907 |
| 2009/0176524 A1 * | 7/2009 | David | 455/518 |
| 2009/0264094 A1 * | 10/2009 | Smith | 455/404.2 |
| 2009/0286504 A1 * | 11/2009 | Krasner et al. | 455/404.1 |
| 2010/0029246 A1 * | 2/2010 | Binning | 455/404.2 |
| 2010/0261492 A1 * | 10/2010 | Salafia et al. | 455/466 |

* cited by examiner

*Primary Examiner* — Julie Lieu
(74) *Attorney, Agent, or Firm* — Luedeka, Neely & Graham, P.C.

(57) ABSTRACT

An emergency event reporting system combines emergency event detection means with a wireless beacon capable of communicating with the Cospas-Sarsat search-and-rescue satellite system. The system provides for the association of a beacon's unique identification number (UIN) with a third-party monitoring service to which the emergency event message is to be reported. In this way, civilian emergency events can be reliably handled without overwhelming limited government search and rescue resources. Several applications of the system are disclosed, which include reporting alarm messages from home and business security systems and crash alerts indicating the deployment of a vehicle air bag during a vehicle crash.

37 Claims, 9 Drawing Sheets

GLOBAL EMERGENCY ALERT NOTIFICATION SYSTEM

This application claims priority to provisional patent application No. 60/764,419 filed Feb. 2, 2006 titled GLOBAL EMERGENCY SYSTEM and nonprovisional patent application Ser. No. 10/934,029 filed Sep. 3, 2004 titled TWO-WAY DISTRESS ALERT AND EMERGENCY LOCATION APPARATUS AND METHOD which issued as U.S. Pat. No. 7,215,282 on May 8, 2007.

FIELD

This invention relates to a global emergency event reporting system. More particularly, this invention relates to detecting an emergency event and reliably reporting that event, regardless of location, to appropriate authorities who can then direct rescue services to the location of the emergency event.

BACKGROUND

In today's mobile society, safety and security of individuals whether in the home, in the workplace, or when traveling through a remote location is a primary concern. The universal nature of this concern is exhibited by the fact that 95% of all households list security as their primary reason for purchasing a cellular telephone. However, the lack of global cellular network coverage and frequent service reliability problems inherent in cellular communications make a cell phone a less than ideal personal safety device for individuals that are at high risk of injury and are frequently out of range of reliable cellular phone service, such as hikers, hunters, boaters, remote workers and travelers to high risk regions. Additionally, cellular phones provide a less than ideal means of notifying rescue authorities of an emergency in situations wherein a user is at a high risk of incapacitation, such as automobile crashes, home break-ins or fires, and in situations where a high degree of third party monitoring is necessary, such as in the monitoring of hazardous material carriers.

There are currently a few devices and systems in the consumer market that attempt to address these concerns. However, those devices and systems have significant deficiencies.

For the last several years, the alarm reporting industry has provided security services to both private residences and small businesses using electronic control panels and central station monitoring equipment that communicates using Dual Tone Multiple Frequency (DTMF) modulation which is supported by local Public Switched Telephone Networks (PSTN). In receiving reports of real-time alarm events, DTMF receiving units at the central monitoring stations perform handshakes and decipher identification strings of data sent by the alarm control panels in order to determine the identification of the customer and the specific nature of the alarm. The two-way capacity of the PSTN also facilitates the ability of the central station operators to send confirmation return requests back to the alarm control units.

In many cases, the providers of electronic security services provide a secondary fully redundant wireless backup communications method that transports the alarm reporting DTMF strings to the central station in the event the local telephone hard-wired services or primary electrical power sources were either deliberately or accidentally disrupted. The wireless system(s) of choice used to communicate the backup alarms have been local cellular communication services. This type of redundant security service brings with it the added costs for both the equipment and monthly cellular service fees. In addition, the availability and reliability of these wireless backup services is totally dependent on the local wireless carrier's actual service coverage range. Due to high volume congestion and the well known dropped calls experienced at peak usage times, wireless cellular communication is not dependable enough for alarm reporting, and therefore does not provide a reliable backup option.

Today, for the most part, alarm reporting service providers continue to support DTMF communications services for subscribers that have older DTMF-only equipment. However, with the objective of obtaining a higher level of efficiency, a newer communications protocol for alarm reporting has been widely accepted and implemented by security industry leaders. That method, referred to as the "Ademco Contact ID" protocol, uses a relatively low-speed but very dependable end-to-end modem communications routine. This format contains a four-digit account number, a three-digit alarm code, a pin status, a two digit area number and a three digit zone or user number. The Ademco Contact-ID format can be depicted as follows:

AAAA P CCC XX ZZZ where AAAA is the account number, P is the pin status (alarm or restore), CCC is the alarm code (which is pre-defined by Ademco), XX is the area number and ZZZ is the zone or user number. The total number of characters required for a complete alarm reporting session, including delimiters, is seventeen.

In addition to home security alarm reporting, there have been efforts to develop a reliable Automatic Crash Notification (ACN) system to enhance the response time of rescue personnel in responding to vehicular crashes. Some vehicle manufacturers have developed ACN systems that are activated by the deployment of a vehicle's air bag system. Use of airbag deployment to activate ACN systems is preferred because air bag systems are virtually standard in new car models. The major system components of the air bag systems are the crash sensors, air bag control system, inflator and the air bag. The air bag control system generally includes control modules that provide direct access via external connectors to continuous real time system data, including air bag deployment alerts which can be used to activate an ACN system.

An example of such an ACN system currently on the market is the OnStar™ in-vehicle safety and communications system offered by General Motors Corporation as an option on select vehicles. The OnStar™ system uses local wireless cellular services to report notice of a crash to an OnStar™ call center system, which then makes emergency information available to a local 911 operator so that appropriate life-saving personnel and equipment can be dispatched to crash scenes. In addition to the aforementioned reliability problems inherent in the cellular services used by OnStar™, there are also coverage availability concerns, particularly in rural areas where about sixty percent of the nation's automotive fatalities occur. Traffic safety and emergency medical experts agree that an ACN system is much more critical in rural areas, where there may not be a passerby to report a crash for a long time after the crash, and where there are fewer local hospitals equipped to treat the kinds of injuries sustained in severe crashes.

Hence, there is a need for a low-cost ACN system that is activated by the deployment of the vehicle's air bag system and which is capable of communicating a crash alert to rescue personnel over a reliable, widely available wireless communication system.

Some existing ACN systems make use of the Global Positioning System (GPS). GPS, which is comprised of a constellation of over fifty satellites, and provides the only truly global satellite navigation system. GPS can be used to determine one's precise location and to provide a highly accurate time reference almost anywhere on Earth or in Earth orbit. The accuracy of the GPS is about 5 meters (16 feet) as of 2005, and has steadily improved over the last several years. Using differential GPS and other error-correcting techniques, its accuracy can be improved to about 1 centimeter (0.4 inches) over short distances. Although the GPS satellite system was designed by and is controlled by the United States Department of Defense primarily for military purposes, it can be used by anyone, free of charge. In the realm of global emergency systems, use of GPS is particularly important in situations where the location of a person needing assistance is not fixed or known.

While GPS can be used to obtain the coordinates of an individual's location, it does not provide a means to transmit and process emergency alerts. This need is addressed by Cospas-Sarsat. Cospas-Sarsat is an international search and rescue system that uses satellites to detect and locate emergency beacons carried by ships, aircrafts or individuals. As shown in FIG. 1, this system 10 consists of a network of satellites 2, ground stations which are referred to as Local User Terminals (LUT) 3, mission control centers 4 and rescue coordination centers 5. Each satellite 2 in the Cospas-Sarsat system can detect and locate alert signals transmitted from 406 MHz beacons 1 that are in the satellite's reception footprint. The satellite 2 then relays the alert signal to a LUT 3 when the satellite 2 is within view of the LUT 3. The Cospas-Sarsat system 10 also allows for the encoding of position data in the transmitted 406 MHz message, thereby providing for quasi-real time alerting with position information. This position data can be obtained from a GPS receiver connected to the emergency beacon transmitter and encoded into the message string transmitted by the beacon.

Since its deployment, the Cospas-Sarsat system has provided a tremendous resource for protecting the lives of aviators and mariners that was unthinkable prior to the space age. Prior to 1995, there were only two types of beacons approved for use within the Cospas-Sarsat system: (1) Emergency Locator Transmitters (ELT) for aircraft and (2) Emergency Position Indicating Radio Beacons (EPIRB) for maritime vessels. In 1995, the system was expanded to allow testing of personal locator beacons (PLBs) in the harsh terrain of the State of Alaska. In 2003, as a result of the success of the test in Alaska, the National Oceanographic and Atmospheric Administration (NOAA) approved the use of PLBs in all of the United States for private and personal use. Since then, many lives and millions of taxpayer dollars have been saved due to search and rescue operations assisted by the use of this satellite-based technology.

The Air Force Rescue Coordination Center (AFRCC) is the government agency responsible for handling distress calls received over Cospas-Sarsat. Now that Cospas-Sarsat is available for private and personal use, the AFRCC simply does not have the means to handle the anticipated workload generated by the thousands of consumer devices that are expected to utilize the system as the primary means of communicating emergency alerts. As a result of the lack of government resources available to support private use of Cospas-Sarsat, very little business development has taken place to take advantage of the availability of Cospas-Sarsat.

Therefore, a system is needed that can harness the global reliability of the GPS and Cospas-Sarsat systems to facilitate the transmission of personal distress signals from consumer devices, such as home alarm systems and ACN systems, without overwhelming the infrastructure that currently handles distress alert signals.

Also, a wireless alarm communication system is needed that is globally ubiquitous and not prone to service outages due to high volume of use, power failures, or natural disaster, and which is capable of communication using industry standard protocols, such as the Ademco Contact ID standard, which are compatible with existing alarm monitoring infrastructures.

SUMMARY

The above and other needs are met by an apparatus which combines emergency event detection means with a wireless beacon capable of communicating with the Cospas-Sarsat system. With this combination, the invention provides for reliably transmitting information about emergency events via the Cospas-Sarsat system. The invention further provides for the association of a beacon's unique identification number (UIN) with a third-party monitoring service to which the alarm message is to be forwarded. In this way, civilian emergency events can be reliably handled without overwhelming limited government search and rescue resources.

In some preferred embodiments, the invention provides an alarm reporting apparatus which includes an alarm processing unit, an interface module, a memory device and a wireless transmitter. The alarm processing unit generates an alarm signal based upon an event detected by an alarm sensor. The interface module, which is in communication with the alarm processing unit, generates an alarm event message based on the alarm signal, where the alarm event message contains information regarding the alarm event. The memory device stores a unique identification number (UIN) that identifies an alarm monitoring service provider designated to receive and process alarm event messages from the alarm reporting apparatus. The wireless transmitter transmits a beacon signal which is received by one or more satellites associated with a satellite-based search and rescue system, such as the Cospas-Sarsat system. The beacon signal contains the alarm event message and the unique identification number.

In other preferred embodiments, the invention is embodied in an ACN system which transmits notice of a vehicle crash event to the Cospas-Sarsat system using a wireless beacon triggered by vehicle airbag deployment. In this embodiment, data fields in the message transmitted from the beacon are loaded with the GPS longitude and latitude data. The crash notification message with GPS data is then relayed to the appropriate third party monitoring service as determined by the beacon's UIN.

In another aspect, the invention provides a method for transmitting notice of an emergency event from an emergency event reporting apparatus. The method include steps of: (a) detecting the emergency event; (b) accessing a unique identification number from a memory device, where the unique identification number identifies at least an emergency event monitoring service provider designated to receive and process emergency event messages; (c) transmitting a beacon signal containing the emergency event message and the unique identification number to satellites associated with a satellite-based search and rescue system, such as the Cospas-Sarsat system; (d) relaying the emergency event message and the unique identification number from the satellites of the satellite-based search and rescue system to a ground-based monitoring center of the satellite-based search and rescue system; (e) determining based on the unique identification number the identity of the emergency event monitoring service provider; and (f) forwarding emergency event information to the identified emergency event monitoring service provider.

In one embodiment, step (a) comprises detecting an alarm condition of a security system. In another embodiment, step (a) comprises detecting deployment of a vehicle airbag.

In yet another embodiment, the invention provides a method for coordinating communications between an emergency event monitoring service provider and a ground-based monitoring center associated with a search and rescue satellite system. The method of this embodiment includes the following steps: (a) storing a plurality of first identification codes in a storage device accessible at the ground-based monitoring center, where the first identification codes are associated with the emergency event monitoring service provider; (b) receiving an emergency event message at the ground-based monitoring center, where the emergency event message includes a second identification code associated with an emergency beacon unit that transmitted the emergency event message; (c) determining that the second identification code matches at least one of the first identification codes; and (d) forwarding the emergency event message from the ground-based monitoring center to the emergency event monitoring service provider that is associated with the matching first identification code.

Some embodiments of the invention provide a method for reporting alarm events from a security system. The method of this embodiment includes steps of: (a) generating a first alarm event message based on an alarm event detected by an alarm sensor of the security system, where the first alarm event message is formatted according to a standard alarm reporting protocol; (b) generating a second alarm event message based on the first alarm event message, where the second alarm event message is formatted to be compatible with a standard emergency beacon transmission protocol; (c) accessing from memory a unique identification number associated with an alarm monitoring service provider that is designated to receive and process alarm event messages from the security system; and (d) transmitting a beacon signal containing the second alarm event message with the unique identification number to one or more satellites associated with a satellite-based search and rescue system. In some preferred embodiments, step (b) comprises generating the second alarm event message in accordance with a standard format defined by the National Marine Electronics Association. In some preferred embodiments, step (a) comprises generating the first alarm event message in accordance with the ADEMCO Contact ID protocol for alarm system communications.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
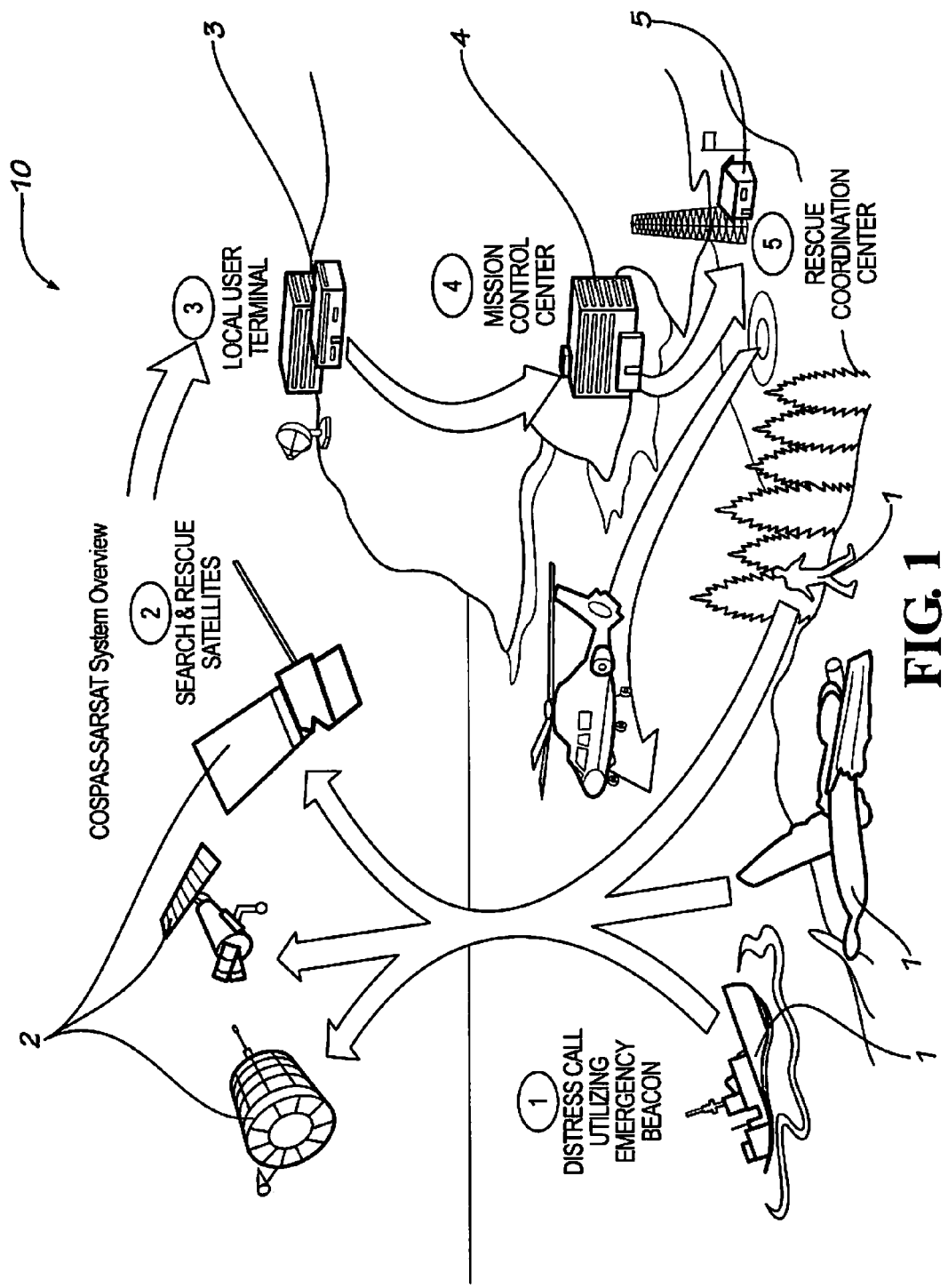
FIG. 1 depicts an overview of the Cospas-Sarsat system.
Figure 2:
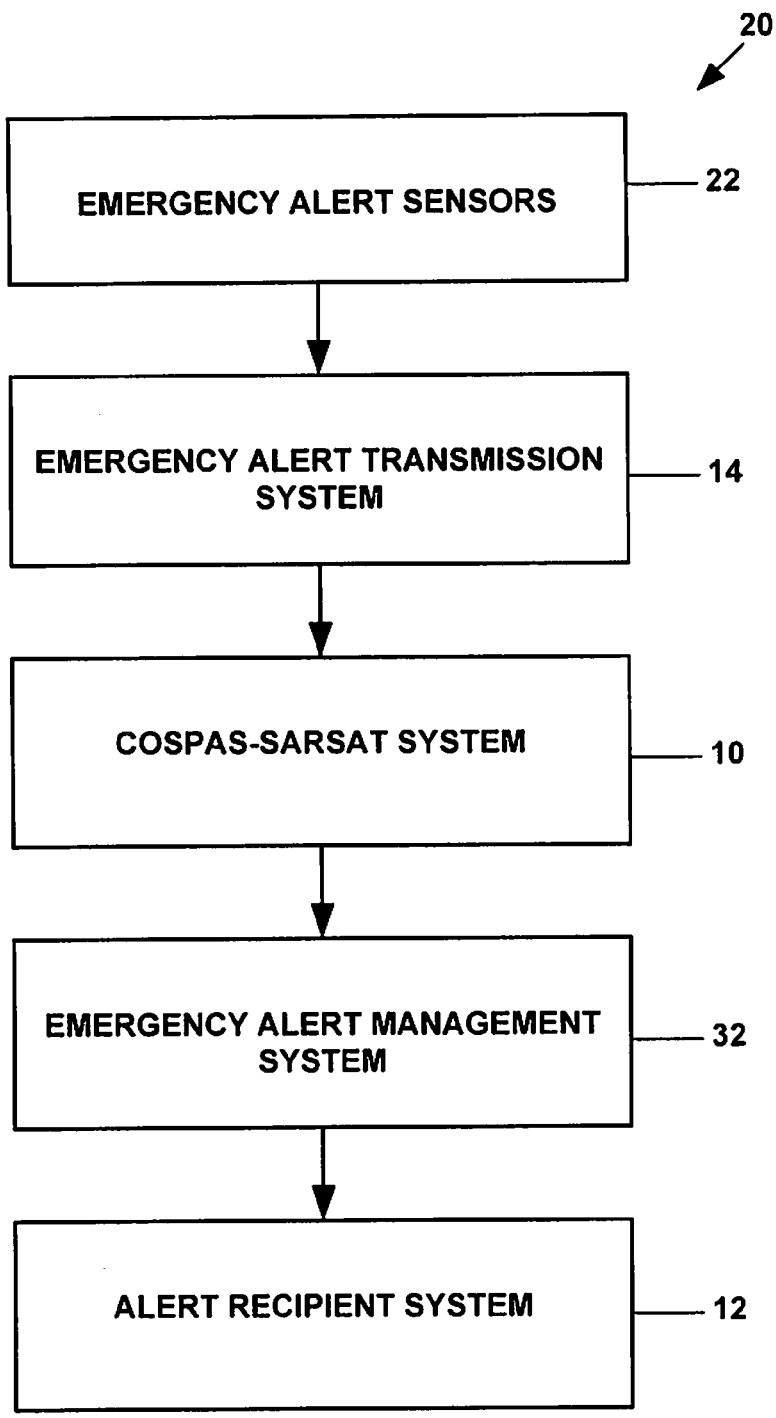
FIG. 2 depicts an emergency event reporting system according to a preferred embodiment of the invention.

FIG. 2 depicts a preferred embodiment of a system 20 for reporting emergency events. The major components of the system 20 include one or more emergency alert sensors 22, an emergency alert transmission system 14, a search-and-rescue satellite system 10 such as the Cospas-Sarsat system, an emergency alert management system 32 and an emergency alert recipient system 12. Each of these system components is described in more detail herein.

The emergency alert sensors 22 detect the occurrence of an emergency event. In one embodiment where the invention is used in a building security system, the emergency alert sensors 22 comprise sensors for detecting fire, smoke, carbon monoxide, motion or forced entry. In another embodiment where the invention is used in an automatic crash notification (ACN) system, the emergency alert sensors 22 comprise sensors for detecting a vehicle crash, such as by monitoring for airbag deployment.

Figure 3:
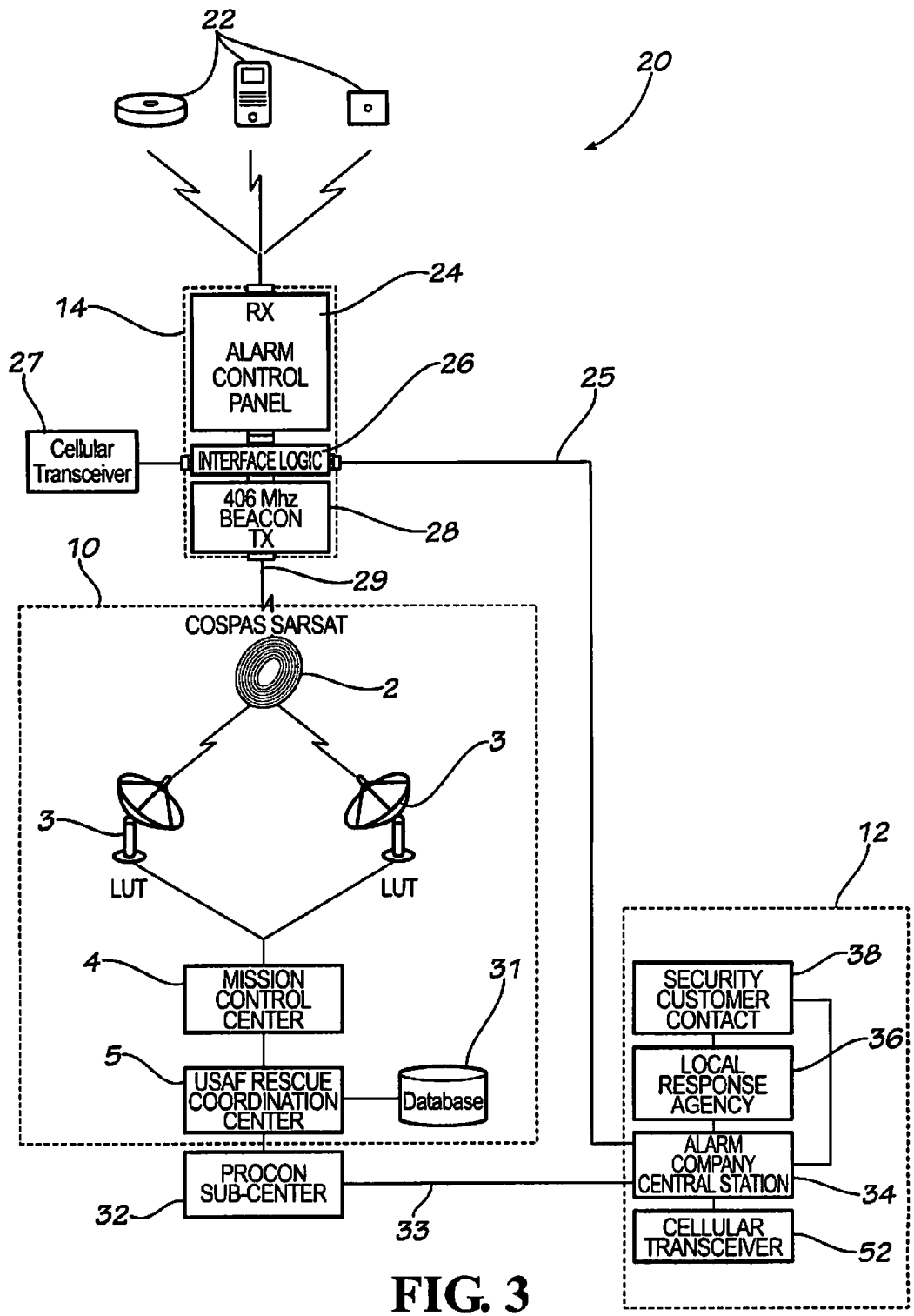
FIG. 3 depicts an emergency event reporting system according to a first embodiment of the invention.

In one embodiment depicted in FIG. 3, the emergency alert transmission system 14 comprises a security system alarm panel 24, an interface logic module 26, and a beacon transmitter 28. In an exemplary embodiment, the panel 24 is capable of receiving and processing emergency signals, generating emergency alert reporting messages in a standard format, such as the ADEMCO Contact-ID format, and forwarding the messages to the interface logic module 26. In another embodiment depicted in FIG. 5, the emergency alert transmission system 14 receives alert signals from air bag deployment system sensors 22 following a vehicle crash. In this embodiment, the interface logic module 26 of the system 14 communicates with the sensors 22 via a communications port 45.

Figure 5:
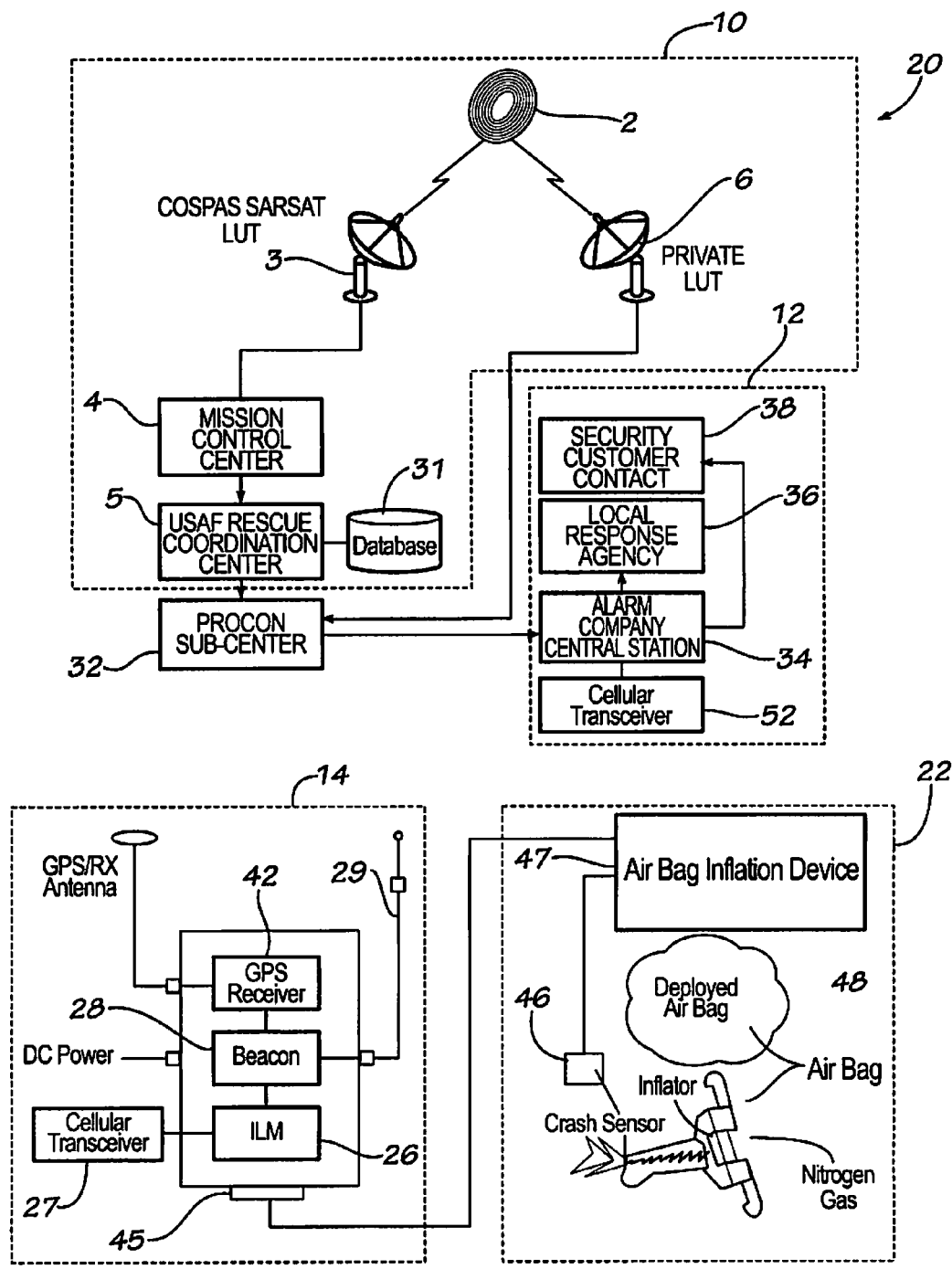
FIG. 5 depicts an emergency event reporting system according to a second embodiment of the invention.

In the embodiments of FIGS. 3 and 5, the interface logic module 26 receives the alert signals and formats them in accordance with the National Marine Electronics Association (NMEA) standard format for transmission from the beacon transmitter 28 via a beacon antenna 29. The beacon transmitter 28 transmits the alert messages along with the unique identification number (UIN) of the particular emergency alert transmission system 14 in the NMEA format. The alert messages are then received by one or more satellites of the COSPAS-SARSAT system 10.

Figure 9:
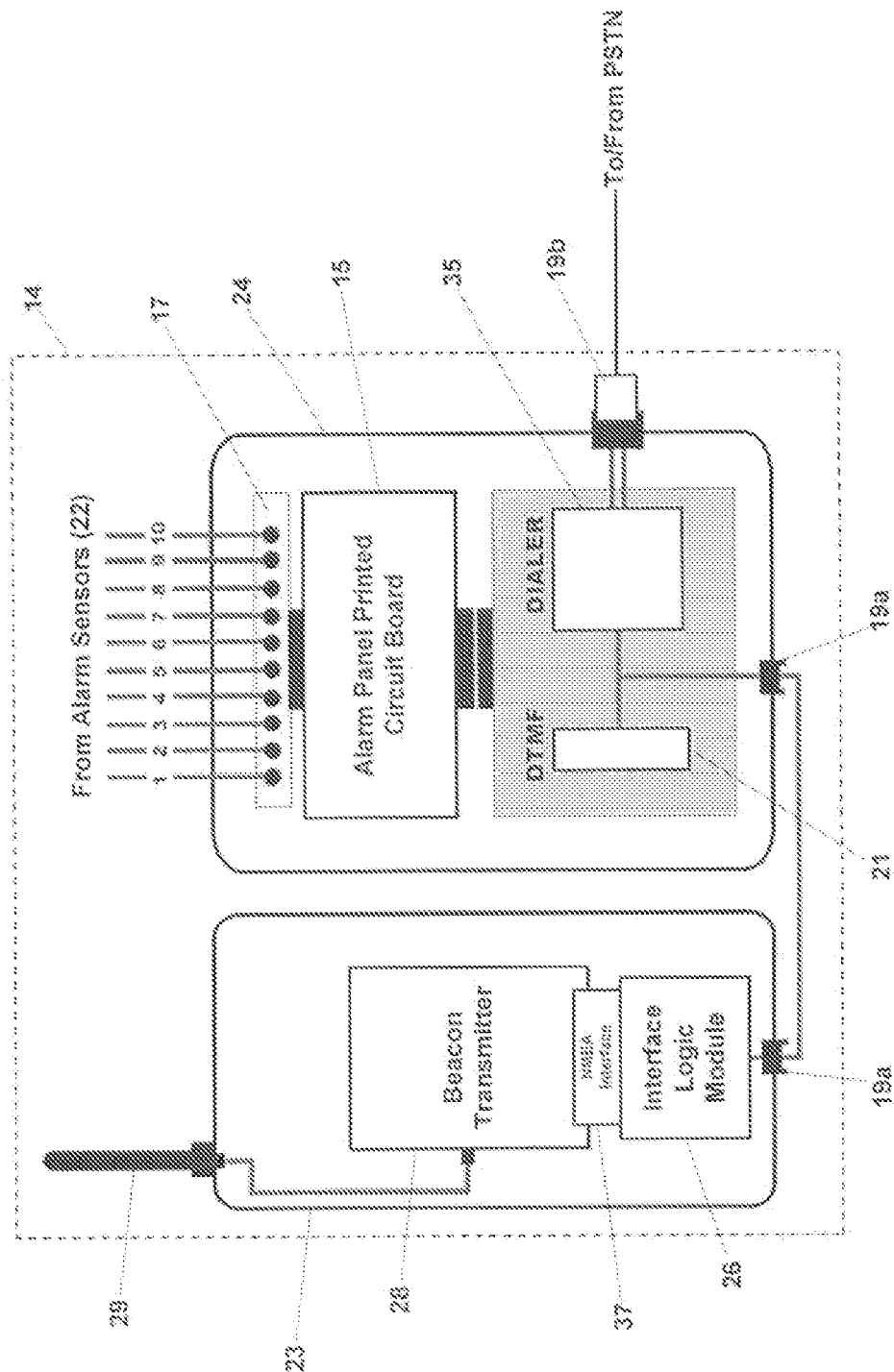
FIG. 9 depicts an emergency alert transmission system according to a preferred embodiment of the invention.

FIG. 9 depicts an embodiment of the emergency alert transmission system 14 wherein the beacon transmitter 28, beacon antenna 29 and the interface logic module 26 are integrated into an alarm beacon unit 23. The alarm beacon unit 23 of this embodiment is connected to a standard security system alarm panel 24 via a telephone line with RJ-11 connectors 19*a*. The alarm panel 24 of FIG. 9 includes a DTMF modulator 21 for generating alarm event messages. For example, the DTMF modulator may generate alarm even messages at 1400/2300 HZ which include a handshake, 4-digit account code and a 2-digit alarm code with a checksum. Alternatively, the alarm panel 24 may implement tone burst and FSK formats in order to report alarm events.

In an exemplary embodiment of the invention, the emergency alert transmission system 14 of FIG. 9 uses the DTMF format to transmit alarm event information to the alarm company central station 34 (FIG. 3) using the beacon unit 23 as a backup or primary wireless reporting device. In this embodiment, the control panel 24 receives a specific alarm from one of the sensors 22 (FIG. 3) connected to the alarm bus 17. Logic circuitry on the printed circuit board (PCB) 15 of the alarm panel 24 identifies the alarm event and prepares to send the required information to the alarm company central station 34 via the Public Switched Telephone Network (PSTN) using the RJ-11 connection 19b. If the presence of dial tone and line voltage is detected, an onboard dialer 35 will automatically dial the directory number assigned to the alarm company. If no PSTN line voltage and dial tone is detected, logic in the alarm panel PCB 15 sends the DTMF message stream to the ILM 26 of the alarm beacon unit 23.

In preferred embodiments of the invention, the ILM 26 converts the DTMF message stream into NMEA format and provides the NMEA message string to the NMEA interface 37 of the beacon transmitter 28. As discussed above, NMEA is a standard protocol used by all GPS receivers to format satellite-based location data. Although NMEA output conforms with the EIA-422A standard, for most purposes it is RS-232 compatible. NMEA format uses 4800 bps, 8 data bits, no parity bit and one stop bit (8N1). NMEA sentences are all ASCII, each beginning with a dollar sign ($) and ending with a carriage-return linefeed (<CR><LF>). Data is comma delimited, and all commas must be included as they act as markers. Following the ($) is the address field (aaccc.Aa) which provides the device ID.

Because home and business security system alarm panels are generally in fixed locations, the alarm company central station 34 does not need actual satellite-based NMEA location information in order to determined the location of the alarm beacon unit. Thus, the normal NMEA location data in the above-described NMEA sentences can be replaced with digits and commas that provide alarm event information, such as a 4-digit unit identification code, a 2-digit alarm code, date and time stamp, and any other information that is required. In a preferred embodiment, the alarm event information complies with the Ademco Contact-ID standard format.

Thus, in the embodiment of FIG. 9, the format of the transmissions from the beacon transmitter 28 is in full compliance with NMEA sentence structures used today for transmitting GPS location data within the Cospas-Sarsat system 10. However, the data stream actually transmitted from the beacon transmitter 28 of FIG. 9 does not contain GPS location information. Instead, the alarm data originating from the alarm panel 24 is formatted to look like GPS location information using the standard NMEA format as previously described. Other embodiments of the invention, particularly those used on vehicles and other mobile platforms, do transmit location data in addition to alarm event data.

Generally, upon receipt of the alert messages transmitted from the beacon transmitter 28, the COSPAS-SARSAT system 10 operates as described above. However, according to preferred embodiments of the invention, when an alert message reaches the United States Air Force Rescue Coordination Center (USAFRCC) 5, the routing of the message depends on the UIN of the emergency alert transmission system 14 that transmitted the alert message. If the UIN is registered with a third-party private monitoring entity, the alert message is forwarded to an emergency alert management system 32 associated with the private monitoring entity. One example of a third-party private monitoring entity is Procon, Inc., which operates an emergency alert management system 32, also referred to herein as the Procon hub, in San Diego, Calif.

The emergency alert management system 32 is a system capable of receiving and processing emergency alert messages in the NMEA format from the COSPAS-SARSAT system 10. One of the functions of the emergency alert management system 32 is to determine what third party alert recipient agency is responsible for responding to alerts generated by the particular emergency alert transmission system 14 that transmitted the alert message. This determination is made based at least in part on the UIN contained in the alert message. If necessary, the emergency alert management system 32 reformats the alert message into a format, such as the ADEMCO contact-ID format, that is compatible with the responsible alert recipient agency. The emergency alert management system 32 then forwards the reformatted message to the alert recipient system 12 associated with the responsible alert recipient agency. In the preferred embodiment, the emergency alert management system 32 maintains simultaneous real-time connectivity to both the USAFRCC 5 of the COSPAS-SARSAT system 10 and the alert recipient system 12.

In the preferred embodiment, the alert recipient system 12 comprises a computer database and communications system operated by an alert monitoring service provider, which may be a security company such as ADT. As described in more detail hereinafter, the alert recipient system 12 receives alert messages from the emergency alert management system 32 and notifies local emergency services agencies regarding the nature and location of the emergency.

FIG. 3 depicts a preferred embodiment of the invention for use in detecting and reporting alarm events, such as in a building. In this embodiment, the emergency alert sensors 22 detect emergency events such as fires and break-ins and generate sensor signals that are provided to the emergency alert transmission system 14. The emergency alert transmission system 14 of this embodiment includes four major components: the alarm control panel 24, the interface logic module (ILM) 26 and the wireless beacon transmitter 28.

The alarm panel 24 of the embodiment of FIG. 3 may be any standard alarm control panel which implements an industry standard communications format. For example, the alarm panel 24 may comprise an ADEMCO/HONEYWELL LYNXR Series alarm control panel which implements the ADEMCO contact-ID digital communications standard. In this embodiment, the alarm panel 24 receives alarm signals from the emergency alert sensors 22 and processes them using the Contact-ID protocol. The sensors 22 may be wireless or hardwired to the alarm panel 24. The alarm panel 24 preferably has battery backup and uses an AC/DC converter as the primary power source. In a preferred embodiment, the alarm panel 24 includes a conventional RJ-11 phone jack for connecting the alarm panel 24 to the ILM 26.

As discussed in more detail below, the ILM 26 includes control logic for determining which communication means is to be used in reporting an alarm event to the alarm company central station 34. In a preferred embodiment of the invention, the ILM 26 selects between three possible communication means: (1) telephone landline 25, (2) cellular telephone transceiver 27 and (3) the beacon transmitter 28. The ILM 26 first checks for availability of the landline 25. If the landline 25 is available, the ILM 26 seizes the line 25 to communicate with the central station 34. If the landline 25 is not available, the ILM 26 checks for the availability of a cellular channel using the cellular transceiver 27. If a cellular channel is available, the ILM 26 establishes a cellular connection to communicate with the central station 34. If a cellular channel is not available, the ILM 26 activates the beacon transmitter 28 to communicate an alarm event message to the central station 34 via the Cospas-Sarsat system 10. Alarm communications via landline and cellular are well known to those skilled in the art and require no further description herein. Alarm communications via the Cospas-Sarsat system 10 are described in further detail hereinafter.

In the exemplary embodiment, the beacon transmitter 28 operates at a frequency of 406 MHz, which is compatible with the COSPAS-SARSAT system 10. However, it will be appreciated that the beacon transmitter 28 may operate at other frequencies as necessary to communicate with the COSPAS-SARSAT system 10 or other search and rescue satellite system. The beacon transmitter 28 transmits an emergency alert message generated by the control panel 24 and/or the ILM 26 to one or more satellites 2 in the Cospas-Sarsat system 10. The satellites 2 relay the emergency message to a LUT 3 which forwards the alert message to a Cospas-Sarsat mission control center 4. The mission control center 4 forwards the alert message to the USAFRCC 5.

The USAFRCC 5 extracts the UIN from the alert message and determines whether the UIN has been registered with a third-party monitoring service, such as Procon, Inc. If the UIN of the beacon is one handled by a third-party monitoring service, the message is forwarded to the emergency alert management system 32 associated with that third-party monitoring service, also referred to as a sub-center, such as the Procon Hub in San Diego.

The sub-center 32 determines which alarm recipient system 12 should receive the alert message by looking up the UIN in a database. The sub-center 32 then forwards the alert message to an alarm company central station 34 of the alert recipient system 12 with which the UIN is associated. The communication link 33 between the sub-center 32 and the alarm company central station 34 may comprise wireless means, such as CDMA, GSM, WIFI, local RF systems, pager networks or power grids, and/or hardwired means such as POTS, minimal service line, T1, cable television lines or Internet. At this point the alarm company central station 34 can handle the alert message according to its standard procedures, such as by communicating with an appropriate local response agency 36, such as local police departments, fire departments or rescue squads. As a part of this process, the alarm company central station 34 may also attempt to contact a security customer contact 38, such as by telephone or email.

Figure 4:
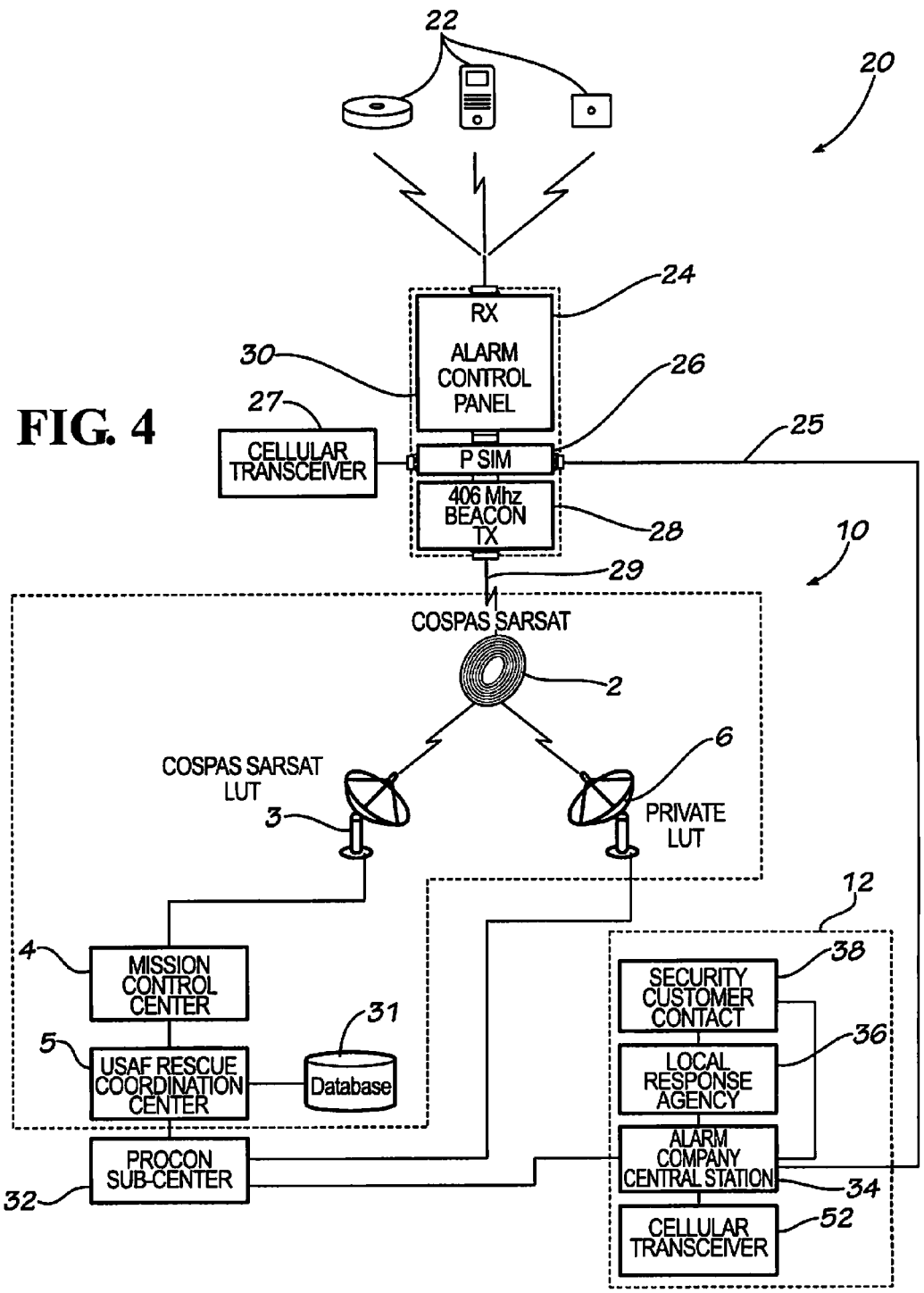
FIG. 4 depicts an emergency event reporting system according to an alternative embodiment of the invention.

FIG. 4 depicts an alternative embodiment of the invention wherein the emergency alert management system 32 is in direct communication with a private LUT 6 which may be owned and/or operated by a third-party monitoring service, such as Procon, Inc. In the example of FIG. 4, the private LUT 6 receives emergency event messages relayed via a Cospas-Sarsat satellite 2 from beacon transmitters 28 that are associated with subscribers of the third-party monitoring service. The private LUT 6 forwards those messages directly to the sub-center hub 32, thereby bypassing the Mission Control Center 4 and the USAFRCC 5.

In one preferred embodiment, the ILM 26 is a Procon Smart Interface Module (PSIM), which is a computer processor that, among other things, provides a two-way communications data interface bridge between the alarm panel 24 and the beacon transmitter 28. In this embodiment, the ILM 26 connects to an RJ-11 output jack on the alarm panel 24, such as an output jack used to connect the alarm panel 24 to a standard phone line in a standard alarm system. The ILM 26 of this embodiment provides:

(1) very accurate clock and calendar functions for date and time stamping of all internal and external event driven transactions;

(2) an alarm reporting application residing in memory of the ILM 26 that maintains a two-way interactive interface between the alarm panel 24 and the ILM 26;

(3) decoding of all alarm messages from the alarm panel 24 and converting those messages to a protocol that is compatible with the wireless beacon transmission protocol, such as the protocol specified by the National Marine Electronics Association (NMEA);

(4) detection of all primary and subsequent alarm events as they occur and reporting with current date and time stamps;

(5) automated preprogrammed self-tests and system status reports;

(6) monitoring of power and reporting of any outages, including battery condition reports; and (7) a complete list of alarm events over some period of time, such as the last 30 days, in a data logger file.

Preferably, the alarm reporting application running on the processor of the ILM 26 is compatible with all of the different two-way network requirements implemented by the various alarm monitoring service companies. In this way, the ILM 26 can automatically process the various requests and responses from the alarm panel 24 that a third-party monitoring service, such as ADT or CENTURYTEL, would normally require in order to process a normal two-way alarm reporting event. Thus, the ILM 26 pre-processes the predetermined customer-specific two-way communication routines, packages the alarm reporting data into packets, reformats the packets into a communications protocol that is compatible with the wireless beacon transmissions (such as that specified by the NMEA), and provides the packets to the beacon transmitter 28 for transmission to the emergency alert management system 32 via the COSPAS/SARSAT system 10.

In a preferred embodiment, the emergency alert management system 32 receives the data packets transmitted via the Cospas-Sarsat system 10 and reconstructs the packets into an alarm event file containing all the information the central station 34 of a third-party alarm monitoring company might need to handle an alarm reporting event. As new information becomes available, the emergency alert management system 32 forwards new alert messages to the central station 34 of the alarm recipient system 12.

In short, when an alarm event occurs, the ILM 26 executes an automated artificial intelligence routine for gathering, reformatting, and transmitting alarm reporting data packets to the emergency alert management system 32. The emergency alert management system 32 then provides the alarm reporting data to the central station 34 of the alert recipient system 12 in a format that the operators can use in performing their scripted alarm reporting duties.

In a preferred embodiment of the invention as used in building security systems, the NMEA communications interface of the beacon transmitter 28 is connected to the one-way data link of the ILM 26. The beacon data fields that are normally used to load and transmit GPS longitude and latitude information are instead loaded with a string of characters with delimiters representing the formatted alarm message, such as in Contact-ID format, generated by the alarm control panel 24. This string of data is transmitted from the beacon transmitter 28 to the emergency alert management system 32 via the Cospas-Sarsat system 10. The emergency alert management system 32 then translates the string back into the Contact-ID format and makes it available to the alert recipient system 12 on a two-way communications retrieval basis.

Figure 6:
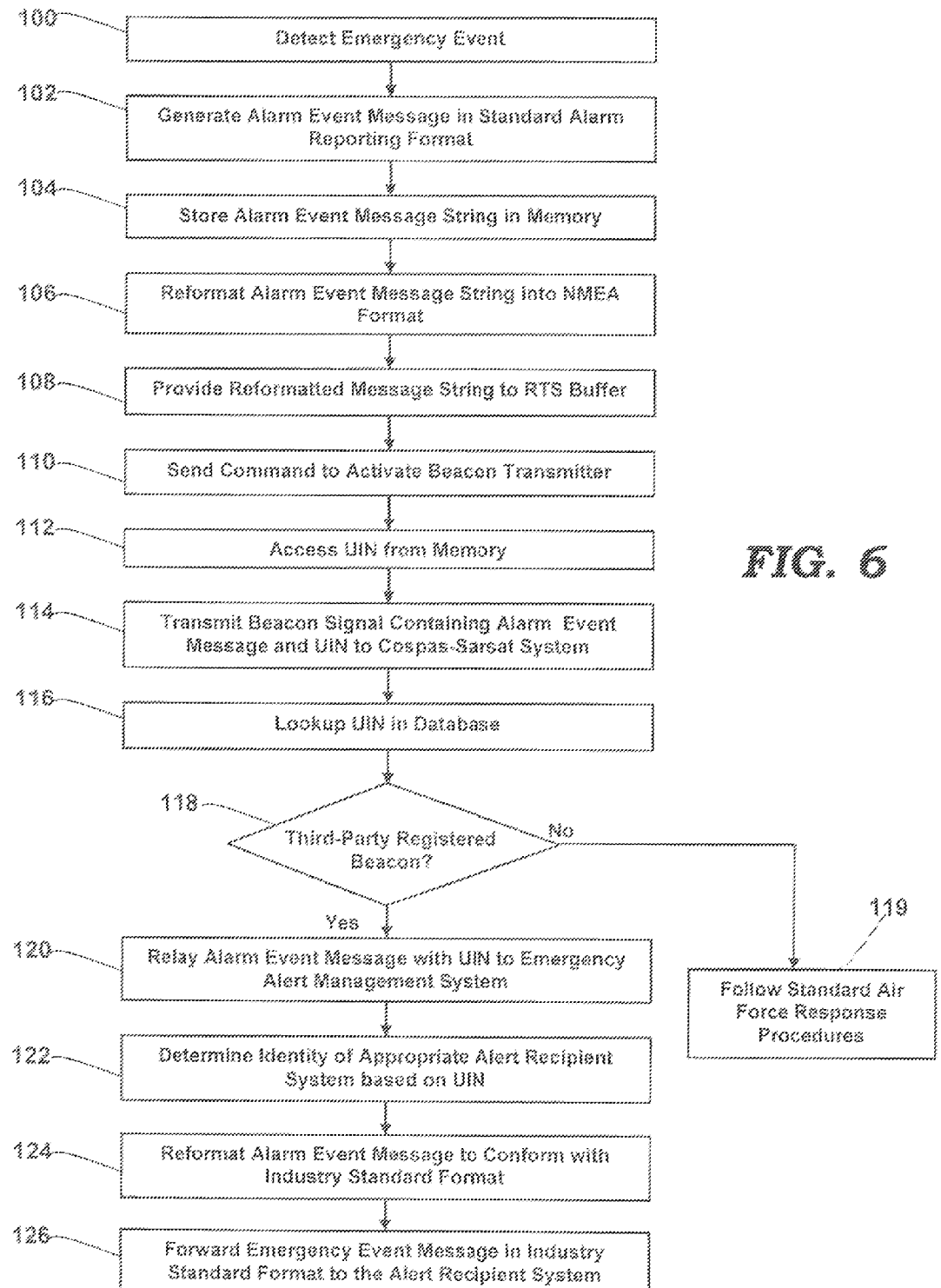
FIG. 6 depicts a flowchart describing a process for transmitting notice of an emergency event according to a first embodiment of the invention.

FIG. 6 depicts steps of a preferred embodiment of a method for reporting alarm events detected by the system 20 depicted in FIG. 3. When an alarm event is detected (step 100), the communications reporting output of the alarm control panel 24 provides the alarm message in a standard format, such as the Ademco Contact-1 format, directly to the ILM 26 (step 102). The ILM 26 receives and stores the alarm message string in a memory location with a date and time stamp attached (step 104). The ILM 26 reformats the message string to be compatible with the NMEA interface of the beacon 28 (step 106). The reformatted string along with the date and time stamp are provided to the beacon transmitter 28 via the NMEA interface, where the string is placed in a "ready-to-send" (RTS) buffer (step 108). The RTS buffer may be in a memory device in the ILM 26 or in a memory device in the beacon transmitter 28. Once the entire message string is in the RTS buffer, the ILM 26 sends a command for the beacon transmitter 28 to power up (step 110). The UIN is accessed from memory (step 112) and the alarm message string with the UIN is transmitted by the beacon transmitter 28 to one or more satellites in the COSPAS-SARSAT system 10 (step 114).

The alarm message is relayed to the AFRCC 5 of the COSPAS-SARSAT system 10, where the UIN is looked up in a database 31 containing a listing of all beacon UINs in association with third-party monitoring services with which the UIN is registered (step 116). If the database query results in a finding that the UIN is not registered with a third-party monitoring service, then standard Air Force emergency event response procedures are followed (step 119). If, on the other hand, the database query results in a finding that the UIN is registered with a third-party monitoring service, then the emergency event message with the UIN is relayed to the emergency alert management system 32 (step 120). In embodiments wherein the emergency alert management system 32 operates its own private LUT 6, the step 118 may be performed from the LUT 6. Based on the UIN, the emergency alert management system 32 determines which alert recipient system 12 is to receive the alarm message (step 122). For example, if the UIN is registered to ADT, the alarm message will be forwarded to an alert recipient system 12 operated by ADT. The alarm event message is then reformatted to conform with an industry standard alarm reporting protocol, such as the Contact-ID standard (step 124), and the message is forwarded to the central station 34 of the appropriate alert recipient system 12 (step 126), such as via an outbound T-1 channel.

As a follow-up to the initial alarm event, the ILM 26 continues to monitor the output of the alarm panel 24 in order to detect and report any subsequent alarms detected by the sensors 22. If additional alarms are detected, the ILM 26 reformats those messages in the same manner as described above and transmits them via the COSPAS-SARSAT system 10 to the emergency alert management system 32 for further handling.

In addition to forwarding alarm event messages to the central station 34, the emergency alert management system 32 also provides any two-way return link requests from the central station 34, provides all diagnostic and exception reporting, such as via the Internet, provides all activation processes for new and decommissioned units, and provides any needed event reporting and follow-up reports to the AFRCC 5.

In another embodiment depicted in FIG. 5, the invention provides crash alert messages in conjunction with an automatic crash notification (ACN) system. In this embodiment, the emergency alert transmission system 14 includes a GPS receiver 42 for generating vehicle location data, a wireless beacon transmitter 28 and an ILM 26. The emergency alert sensors 22 of this embodiment include a crash sensor 46 and air bag control module 47 of a vehicle air bag system. In this embodiment, a crash alert message is generated upon deployment of the vehicle's airbag 48. In a typical vehicle air bag system, airbag deployment is triggered upon detection of a vehicle crash by the crash sensor 46. The sensor 46 sends a sensor signal indicative of a crash to the air bag control module 47 which controls deployment of the air bag 48. When actual emergency deployment of an air bag 48 takes place, the control module 47 sends a deployment signal to the emergency alert transmission system 14, such as via a serial data link connected to an external serial port 45. It will be appreciated, however, that the invention is not limited to communication over a serial port, as other means of communication between the air bag control module 47 and the emergency alert transmission system 14 may be provided, such as wireless communication means. Generally, the emergency alert transmission system 14 of this embodiment communicates with the Cospas-Sarsat system 10 and ground receiving and monitoring stations in substantially the same way as the alarm reporting systems depicted in FIG. 3. In this embodiment, however, the data fields of the alert message string are loaded with location data obtained from the GPS receiver 42 so that emergency personnel responding the emergency event can locate the wrecked vehicle.

Figure 7:
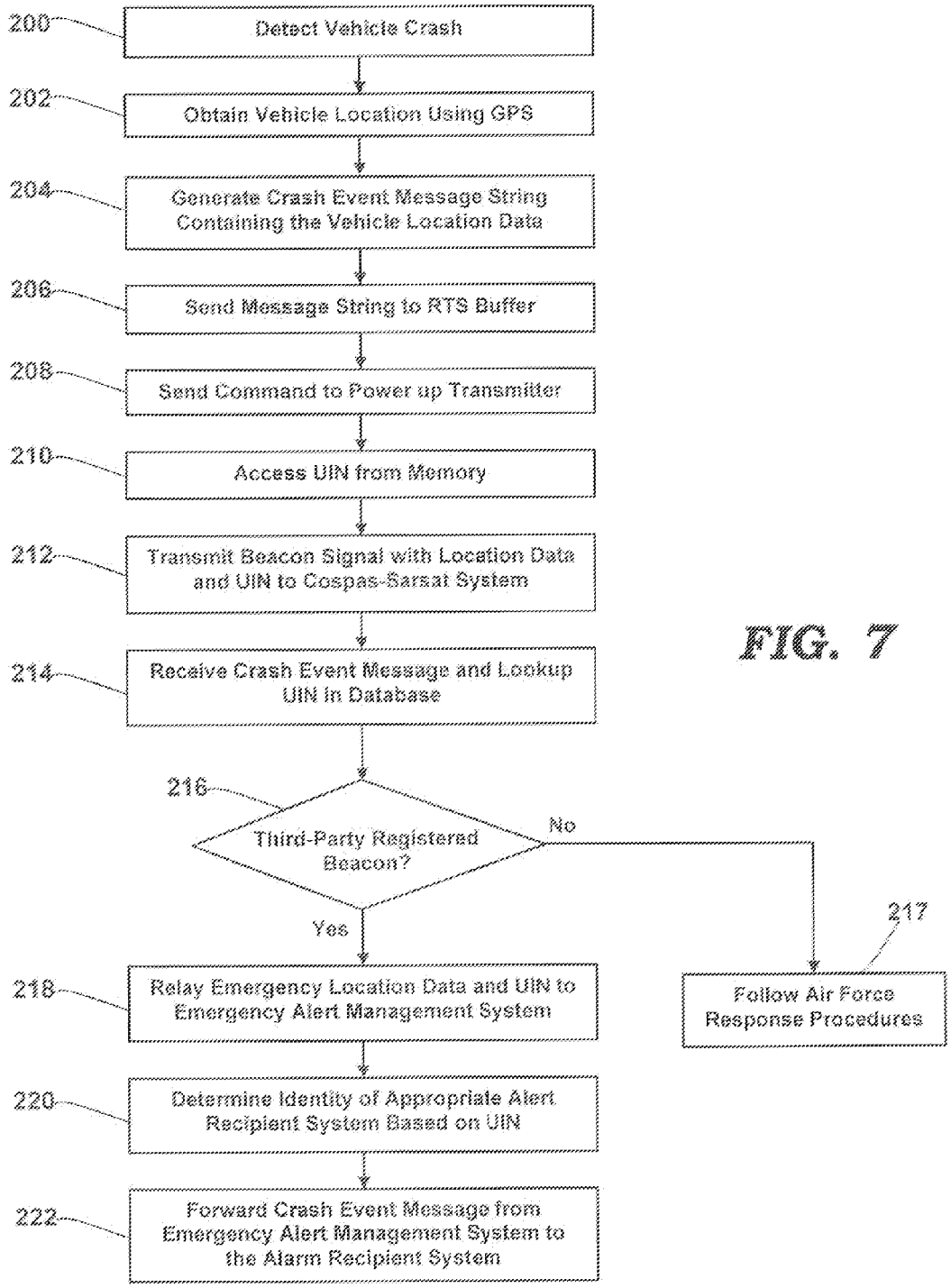
FIG. 7 depicts a flowchart describing a process for transmitting notice of an emergency event according to a second embodiment of the invention.

FIG. 7 depicts a flow chart describing the operation of the preferred embodiment of the invention depicted in FIG. 5. According to this embodiment, when a crash event is detected (step 200), the vehicle's location is determined using the GPS receiver 42 (step 202). The ILM 26 receives the vehicle location and generates a crash event message string containing the vehicle location data (step 204), preferably in accordance with the NMEA format. The crash event message string with date and time stamp is provided to the beacon transmitter 28, such as via an NMEA interface, where the message string is placed in a "ready-to-send" (RTS) buffer (step 206). Once the entire message string is in the RTS buffer, the ILM 26 sends a command to activate the beacon transmitter 28 (step 208). The UIN is accessed from memory (step 210), and the transmitter 28 transmits the crash event message with the UIN to the satellites 2 of the COSPAS-SARSAT system 10 (step 212).

The crash event message is received by the AFRCC 5 of the COSPAS-SARSAT system 10, where the UIN is looked up in a database containing a listing of all beacon UINs in association with third-party monitoring services with which the UIN is registered (step 214). If the database query results in a finding that the UIN is not registered with a third-party monitoring service (step 216), then standard Air Force emergency event response procedures are followed (step 217). If the database query results in a finding that the UIN is registered with a third-party monitoring service (step 216), then the crash event message with the UIN is relayed to the emergency alert management system 32 (step 218). As with the alarm reporting embodiment discussed above, it will be appreciated that the emergency alert management system 32 may operate its own private LUT 6 and receive the crash event message from the private LUT 6 rather than from the AFRCC 5. The emergency alert management system 32 then determines the appropriate alert recipient system 12 based on the UIN (step 220). The crash event message is then reformatted to conform with the standard format of the alert recipient system 12 and is forwarded to the central station 34 of the alert recipient system 12, such as via an outbound T-1 channel (step 222).

In the above described embodiments, the beacon transmitter 28 is integrated with other components to form a complete system 14. In these embodiments, the UIN of the beacon transmitter may already be associated with a third-party monitoring service, such as ADT. According to other embodiments of the invention, consumers may purchase off-the-shelf stand-alone personal emergency beacon units and then register those beacon units with a third-party monitoring service, such as provided by Procon, Inc. To facilitate such consumers, a preferred embodiment of the invention provides a method to allow consumers to register their personal beacons units with a third party monitoring service, such as using a web page interface. This registration process is depicted in FIG. 8.

Figure 8:
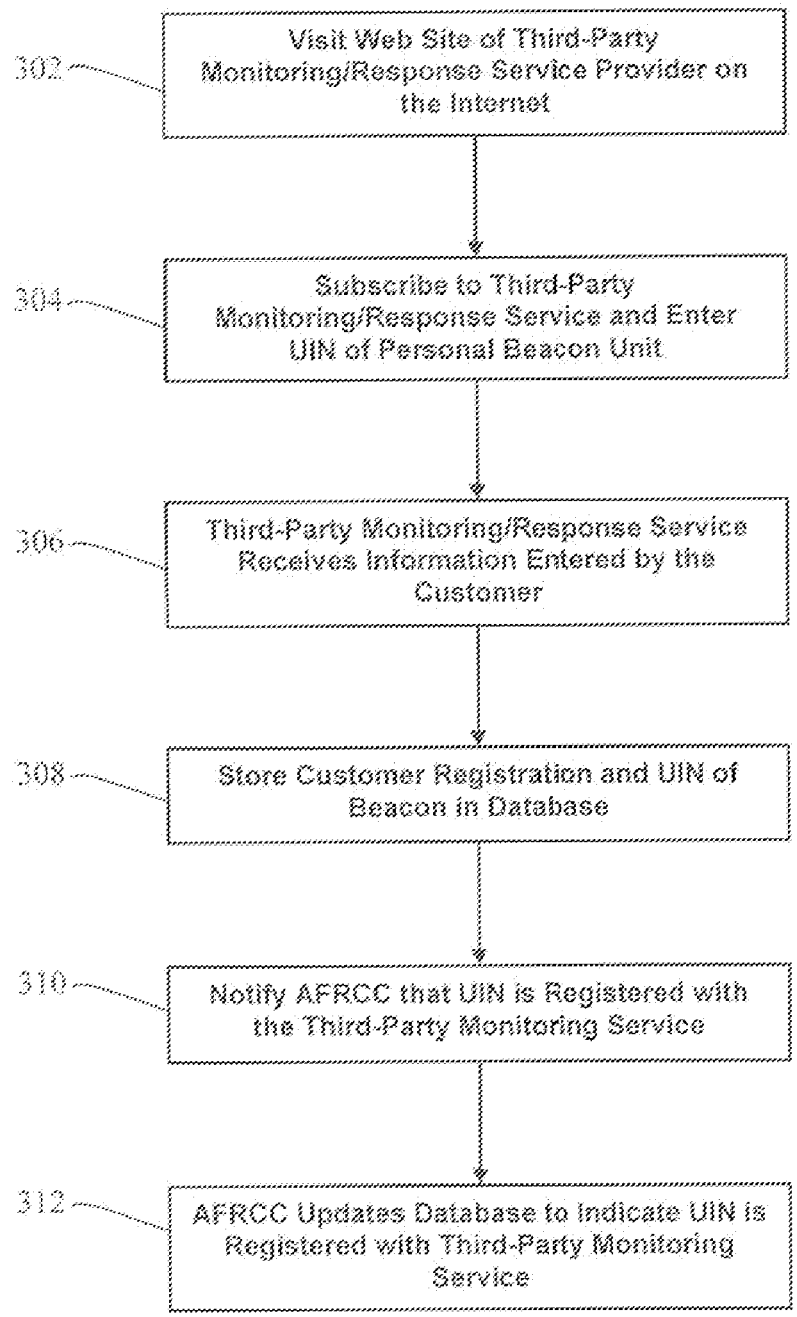
FIG. 8 depicts a flowchart describing a process for registering an emergency beacon with a monitoring service provider via a global communication network according to a preferred embodiment of the invention.

As shown in FIG. 8, a customer having purchased a personal emergency beacon unit visits a web site provided by a third-party monitoring service provider or response service provider via the Internet (step 302). Using the webpage interface, the customer then subscribes to the third-party monitoring service which includes entering the UIN of the beacon unit (step 304). The third-party monitoring service receives the information entered by the customer (step 306) and stores the customer information in a database in association with the UIN of the beacon unit (step 308). The third-party monitoring service then sends a record to the AFRCC 5, such as via a Virtual Private Network (VPN) connection, containing the customer-registered UIN and the identity of the third-party monitoring service. This provides notification to the AFRCC 5 that this particular UIN is now registered with the particular third-party monitoring service (step 310). The AFRCC 5 then updates its database 31 (FIG. 3) to indicate that the UIN is associated with the third-party monitoring service (step 312). If and when the registered beacon unit is triggered to transmit an emergency alert, the UIN of the registered beacon unit can be used to identify the appropriate third-party monitoring service. Although the preferred embodiment provides for registration of a beacon unit via the Internet, it should be appreciated that the invention is not limited to such registration means and other registration means such as a phone, text messaging, e-mail or conventional mail may be used.

The embodiments described above are applicable to home and business security systems and automatic vehicle crash notification systems. It will be appreciated that the invention is also applicable to other emergency event reporting situations. For example, embodiments of the invention may be used to report emergency events as detected by sensors installed on a hazardous materials (HAZMAT) delivery vehicle. These embodiments aid in the protection of hazardous materials during transport and protection of the driver's security in the event of a hostile takeover or an accident.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An emergency event reporting apparatus for transmitting emergency event messages via satellites associated with a search and rescue system to a ground-based satellite monitoring center of the search and rescue system, the emergency event reporting apparatus comprising:

means for detecting an emergency event;

means for generating an emergency event message upon detection of the emergency event, where the emergency event message contains information regarding the emergency event;

means for storing a unique identification number that uniquely identifies the emergency event reporting apparatus and is associated with one of a plurality of private third-party emergency event monitoring service providers designated to receive and process emergency event messages transmitted from emergency event reporting apparatuses that are relayed through the ground-based satellite monitoring center; and means for transmitting a beacon signal containing the emergency event message and the unique identification number to the satellites associated with the search and rescue system, whereby the ground-based satellite monitoring center can determine, based on the unique identification number contained in the emergency event message, which one of the plurality of private third-party emergency event monitoring service providers is to receive the emergency event message for processing.

2. The emergency event reporting apparatus of claim 1 wherein the means for detecting an emergency event include one or more intrusion detection devices of a security system.

3. The emergency event reporting apparatus of claim 1 wherein the means for detecting an emergency event include an alarm processing unit of a security system.

4. The emergency event reporting apparatus of claim 1 wherein the means for detecting an emergency event include a vehicle crash sensor.

5. The emergency event reporting apparatus of claim 1 wherein the means for detecting an emergency event include a vehicle air bag deployment system.

6. The emergency event reporting apparatus of claim 1 wherein the means for detecting an emergency event include a fire sensor.

7. The emergency event reporting apparatus of claim 1 herein the means for transmitting a beacon signal comprises a radio beacon transmitter operating at about 406 MHz.

8. The emergency event reporting apparatus of claim 7 wherein the means for storing a unique identification number comprises a memory device associated with the radio beacon transmitter.

9. The emergency event reporting apparatus of claim 1 wherein the search and rescue system comprises the Cospas-Sarsat system.

10. An alarm reporting apparatus for transmitting alarm event messages via satellites associated with a search and rescue system to a ground-based satellite monitoring center of the search and rescue system, the alarm reporting apparatus comprising:

an alarm processing unit for generating an alarm signal based upon an event detected by an alarm sensor;

an interface module in communication with the alarm processing unit, the interface module for generating an alarm event message based on the alarm signal, where the alarm event message contains information regarding the alarm event;

one or more memory devices for storing a unique identification number that uniquely identifies the alarm reporting apparatus and is associated with one of a plurality of private third-party alarm monitoring service providers designated to receive and process alarm event messages transmitted from the alarm reporting apparatuses that are relayed through the ground-based satellite monitoring center; and a transmitter for transmitting a beacon signal containing the alarm event message and the unique identification number to the satellites associated with the search and rescue system, whereby the ground-based satellite monitoring center can determine, based on the unique identification number contained in the alarm event message, which one of the plurality of private third-party alarm monitoring service providers is to receive the alarm event message for processing.

11. The alarm reporting apparatus of claim 10 wherein the transmitter transmits the beacon signal at about 406 MHz.

12. The alarm reporting apparatus of claim 10 wherein the search and rescue system comprises the Cospas-Sarsat system.

13. The alarm reporting apparatus of claim 10 wherein
the alarm processing unit generates the alarm signal in accordance with an industry-standard alarm event communication protocol; and
the interface module generates the alarm event message in accordance with a standard format used to encode location coordinate data in emergency beacon transmissions.

14. The alarm reporting apparatus of claim 13 wherein the interface module generates the alarm event message in accordance with a standard format defined by the National Marine Electronics Association.

15. The alarm reporting apparatus of claim 13 wherein the alarm processing unit generates the alarm signal in accordance with an Ademco Contact ID protocol for alarm system communications.

16. The emergency event reporting apparatus of claim 1 further comprising:
means for determining a geographic location of the emergency event reporting apparatus and generating location data based thereon; and
the means for transmitting the beacon signal further for transmitting the beacon signal containing at least the location data and the unique identification number in a format compatible with the search and rescue system.

17. The apparatus of claim 16 wherein the means for detecting an emergency event detects unauthorized entry into a secured compartment of a vehicle.

18. The apparatus of claim 16 wherein the means for determining a geographic location comprises a Global Positioning System receiver.

19. A method for transmitting notice of an emergency event from an emergency event reporting apparatus to a ground-based satellite monitoring center via satellites associated with a search and rescue system, the method comprising the steps of:
(a) detecting the emergency event;
(b) accessing a unique identification number from a memory device, where the unique identification number uniquely identifies one of a plurality of emergency event monitoring service providers designated to receive and process emergency event messages that are relayed through the ground-based satellite monitoring center;
(c) transmitting a beacon signal containing the emergency event message and the unique identification number to the satellites associated with the search and rescue system;
(d) relaying the emergency event message and the unique identification number from the satellites of the search and rescue system to the ground-based satellite monitoring center of the search and rescue system;
(e) determining based on the unique identification number the identity of the emergency event monitoring service provider designated to receive and process the emergency event message contained in the beacon signal; and
(f) forwarding emergency event information to the emergency event monitoring service provider determined in step (e).

20. The method of claim 19 wherein step (a) comprises detecting an alarm condition of a security system.

21. The method of claim 19 wherein step (a) comprises detecting deployment of a vehicle airbag.

22. The method of claim 19 wherein step (a) comprises detecting a fire alarm condition.

23. The method of claim 19 wherein step (c) comprises transmitting the beacon signal at about 406 MHz.

24. The method of claim 19 wherein step (c) comprises transmitting the beacon signal to the Cospas-Sarsat satellite system.

25. The method of claim 24 wherein:
step (d) further comprises relaying the emergency event message to a United States Air Force Rescue Coordination center;
step (e) is performed at the United States Air Force Rescue Coordination Center; and
step (f) comprises forwarding the emergency event message from the United States Air Force Rescue Coordination Center to the emergency event monitoring service provider determined in step (e).

26. A method for coordinating communications between an emergency event monitoring service provider and a ground-based monitoring center associated with a search and rescue satellite system, the method comprising the steps of:
(a) storing a plurality of first identification codes in a storage device accessible at the ground-based monitoring center, where the first identification codes identify a plurality of emergency beacon units which the emergency event monitoring service provider has been assigned to monitor;
(b) receiving an emergency event message at the ground-based monitoring center, where the emergency event message includes a second identification code which identifies an emergency beacon unit that transmitted the emergency event message;
(c) determining that the second identification code matches at least one of the first identification codes;
(b) forwarding at least a portion of information contained in the emergency event message from the ground-based monitoring center to the emergency event monitoring service provider that has been assigned to monitor the emergency beacon unit identified by the second identification code.

27. The method of claim 26 wherein the ground-based monitoring center is a United States Air Force Rescue Coordination Center associated with a Cospas-Sarsat satellite system.

28. A method for reporting alarm events from a security system to a ground-based satellite monitoring center via satellites associated with a search and rescue system, the method comprising:

(a) generating a first alarm event message based on an alarm event detected by an alarm sensor of the security system, where the first alarm event message is formatted according to a standard alarm reporting protocol;

(b) generating a second alarm event message based on the first alarm event message, where the second alarm event message is formatted to be compatible with a standard emergency beacon transmission protocol;

(c) accessing from memory a unique identification number that uniquely identifies one of a plurality of private third-party alarm monitoring service providers that is designated to receive and process alarm event messages from the security system;

(d) transmitting a beacon signal containing the second alarm event message with the unique identification number to the satellites associated with the search and rescue system; and (e) determining, based on the unique identification number contained in the second alarm event message, which one of the plurality of private third-party alarm monitoring service providers is to receive the alarm event message for processing.

29. The method of claim 28 wherein step (d) comprises transmitting the beacon signal at about 406 MHz.

30. The method of claim 28 wherein step (d) comprises transmitting the beacon signal to one or more satellites associated with the Cospas-Sarsat system.

31. The method of claim 28 wherein step (b) comprises generating the second alarm event message in accordance with a standard format defined by the National Marine Electronics Association.

32. The method of claim 28 wherein step (a) comprises generating the first alarm event message in accordance with the ADEMCO Contact ID protocol for alarm system communications.

33. A process for registering a beacon unit with a monitoring service provider comprising the steps of:
(a) providing means of electronic communication between a registrant and the monitoring service provider;
(b) submitting a unique identification number of the beacon unit and registrant information to the monitoring service provider via the means of electronic communication;
(c) storing the unique identification number of the beacon unit in association with the registrant information in a first database accessible to the monitoring service provider; and
(d) storing the unique identification number of the beacon unit in association with identification information for the monitoring service provider in a second database accessible to a ground-based satellite monitoring center of a search and rescue system;

whereby the ground-based satellite monitoring center can identify, based on the unique identification number stored in the second database, the monitoring service provider to which beacon messages are to be directed for processing.

34. The process of claim 33 wherein
step (a) comprises providing a web page interface accessible via the Internet; and
step (b) includes entering the unique identification number of the beacon unit and registrant information using the web page interface.

35. An alarm beacon unit for interfacing with an alarm panel of a security system and for wirelessly transmitting alarm information, wherein the alarm panel generates first alarm event messages containing the alarm information formatted according to an industry-standard alarm reporting protocol, the alarm beacon unit comprising:
an interface logic module in communication with the alarm panel, the interface logic module for receiving the first alarm event messages and reformatting the alarm information to form second alarm event messages which are compatible with transmission via satellites of the Cospas-Sarsat search and rescue satellite system; and
a beacon transmitter interfaced with the interface logic module, the beacon transmitter for wirelessly transmitting the second alarm event messages to one or more satellites associated with the Cospas-Sarsat search and rescue satellite system.

36. The alarm beacon unit of claim 35, wherein the interface logic module receives the first alarm event messages formatted in accordance with the ADEMCO Contact ID protocol for alarm system communications.

37. The alarm beacon unit of claim 35, wherein the interface logic module reformats the alarm information to form the second alarm event messages in accordance with a standard format defined by the National Marine Electronics Association.

* * * * *